Patented Aug. 15, 1944

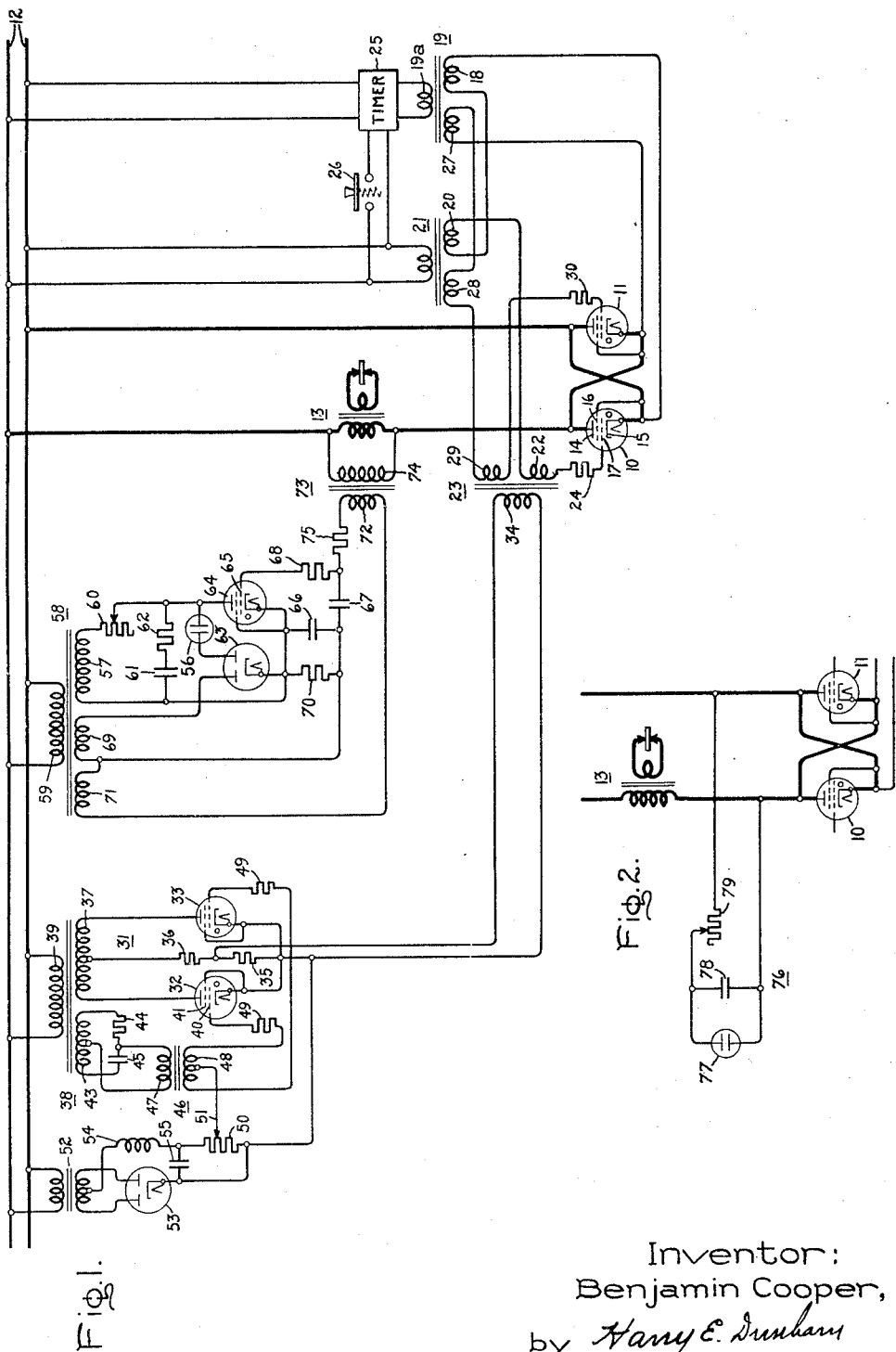

2,355,952

UNITED STATES PATENT OFFICE 2,355,952

ELECTRIC CONTROL CIRCUIT

Benjamin Cooper, Scotia, N. Y., assignor to General Electric Company, a corporation of New York Application November 1, 1943, Serial No. 508,612

5 Claims. (Cl. 172—245)

My invention relates to electric control circuits and more particularly to an improved indicating circuit especially adapted for providing an indication of the phase angle at which the excitation voltage applied to the control members of reversely connected electric valves becomes positive with respect to the critical voltage of the electric valves.

In electric valve circuits for controlling the energization of the welding transformer of a resistance welding system, for example, reversely connected electric valve means have been widely used for supplying alternating current of adjustable magnitude to the welding transformer. The electric valves may be controlled by a periodic voltage of peaked wave form which controls the instant in the positive anode voltage cycle of the valve at which it is rendered conductive. If the voltage of peaked wave form is impressed on the control member before the anode voltage has become positive, it is impossible to initiate conduction in the valve, and if the periodic voltage decreases before the anode voltage becomes positive, the entire half cycle of energization of the load circuit may be omitted. This results in unidirectional magnetization of the welding transformer and as a result in the supply of unequal amounts of welding current to the work during successive weld periods. However, in order to supply full heat to the welding transformer, it is essential to advance the peaked voltages so that they occur substantially at the instant that the anode voltage of the incoming electric valve reverses. For this reason, it is desirable to facilitate the adjustment of the maximum angle of advance of the periodic voltage of peaked wave form so that full heat may be obtained, and at the same time to avoid the undesirable effects of advancing these voltages ahead of the point where the anode voltage of the incoming valve has become positive. In my copending application Serial No. 508,612, filed concurrently herewith and assigned to the assignee of this invention, there is described and claimed a circuit for preventing the application of periodic voltages of peaked wave form to the control members earlier than the instant corresponding to normal current zero as determined by the power factor of the load circuit.

It is an object of my invention to provide a new and improved electric control circuit.

It is another object of my invention to provide a new and improved control and indicating circuit for indicating the phase position of the initiation of conduction of electric valve means which are reversely connected in parallel between an alternating current supply circuit and an inductive load circuit.

My invention will be better understood by reference to the following description taken in connection with the accompanying drawing, and its scope will be pointed out in the appended claims. In the drawing, Fig. 1 is a schematic representation of one embodiment of my invention, and Fig. 2 is a modification of the embodiment illustrated in Fig. 1.

In accordance with the illustrated embodiment of my invention, I provide an indicating circuit energized in accordance with the voltage appearing across a pair of reversely connected electric valves, which provides an indication of the point in the anode voltage wave at which the electric valves are rendered conductive, so that the full heat setting may be made without danger of advancing the peaked voltage ahead of the point where the anode voltage of the incoming valve becomes positive.

Referring now to the drawing, I have shown my invention embodied in a control circuit for controlling the conductivity of a pair of electric valve means 10 and 11 which are reversely connected in parallel between an alternating current supply circuit 12 and a load circuit, such as a welding transformer 13. The electric valve means 10 and 11 may be any of the types well known in the art and, as illustrated, each comprises an anode 14, a cathode 15, a control member or grid 16 and a shield grid 17. The electrodes are mounted within an envelope which is preferably filled with an ionizable medium such as a gas or a vapor. The conductivities of the electric valves 10 and 11 are controlled in accordance with the resultant of three voltages which are impressed on the control members 16 thereof. As illustrated in the drawing, the cathode-to-control member circuit of the electric valve 10 is completed through a secondary winding 18 of a transformer 19, a secondary winding 20 of a transformer 21, a secondary winding 22 of a transformer 23 and a current limiting resistor 24. The transformer 23 is preferably a peaking transformer of the self-saturating type. The transformer 19 supplies an alternating current voltage component which is in phase with the anode voltage of the electric valve 10 and which appears intermittently under the control of a timer illustrated schematically and designated by the numeral 25. The timer controls the energization of the primary winding 19a of transformer 19. The timer may, as illustrated, be energized from the alternating current supply 12 through an initiating switch 26. The secondary winding 20 of transformer 21 continuously impresses an alternating current voltage on control member 17 which is in phase opposition with the anode voltage of the electric valve 10. The secondary winding 22 of transformer 23 impresses a peaked voltage on the control member 17 to determine the instant in the anode-cathode voltage wave at which the electric valve is rendered conductive. The relative magnitudes of the voltages impressed on the control member 17 by transformer windings 18, 20 and 22 are such that both the peaked voltage of the winding 22 and the alternating current turn-on voltage of the winding 18 are required to render the electric valve conductive. In this way, the number of cycles during which the electric valve 10 conducts is determined by the timer control and the instant in each voltage wave that conduction is initiated is determined by the phase position of the peaked voltage of winding 22. In a similar way, the cathode-to-control member circuit of electric valve 11 includes a winding 27 of transformer 19, a winding 28 of transformer 20 and a winding 29 of transformer 23 and a current limiting resistor 30.

The phase position of the peaked voltages produced by the secondary windings 22 and 29 of transformer 23 is determined by a phase shifting circuit illustrated generally by the numeral 31 and including a pair of electric valve means 32 and 33 which are connected with the primary winding 34 of the transformer 23 to impress suddenly an alternating current voltage thereon at the instant conduction is initiated in either of the valves. The primary winding 34 is connected across a resistor 35 and in series with a resistor 36 which is connected to the midpoint of a transformer secondary winding 37 of a transformer 38. The primary winding 39 of the transformer 38 is energized from the alternating current supply circuit 12. The end terminals of the secondary winding 37 are connected to the anodes of the valves 32 and 33, respectively, and the cathodes of these valves are connected together and to one terminal of the resistor 35. Thus when electric valve 32 is rendered conductive, transformer primary winding 34 is shock-excited at a predetermined time during half cycles of voltage of the supply circuit of one polarity, and when electric valve 33 is rendered conductive the winding is shock-excited at a corresponding time during half cycles of the supply circuit voltage of opposite polarity. The resistor 36 in series with primary winding 34 serves to adjust the magnitude of the voltage peak. The electric valves 32 and 33 are preferably of the gas-filled type and, as illustrated, each comprises a control member or grid 40 and a shield grid 41 which is connected directly to the cathode bus. The instant of initiation of conduction of electric valves 32 and 33 is controlled by the combination of an alternating current component of voltage and a direct current component of voltage which may be varied in magnitude to regulate an electrical condition of the load circuit. The alternating current component of voltage preferably lags the anode voltage of valves 32 and 33 by substantially ninety degrees, and in the illustrated embodiment of the invention is derived from the alternating current circuit 12 by means of a midtapped secondary winding 43 of the transformer 38. The midtapped winding 43 forms two legs of a phase shifting bridge which is completed by a resistor 44 and a capacitor 45 connected in series between the end terminals of the winding 43.

The alternating current component of voltage for energizing the control grids 40 of electric valves 32 and 33 is derived from the phase shifting network by means of a transformer 46 having the primary winding 47 thereof connected between the midtap on the transformer secondary winding 43 and the common terminal of resistor 44 and capacitor 45. The secondary winding 48 of the transformer 46 has the end terminals thereof connected through current limiting resistors 49 to the control grids 40 of electric valves 32 and 33, respectively. A unidirectional voltage of adjustable magnitude is impressed between the cathodes of electric valves 32 and 33 and the control members thereof by means of a resistor 50 having one terminal connected with the cathodes of the electric valves 32 and 33 and provided with an adjustable tap 51 which is connected with the midtap of transformer winding 48. In the particular embodiment illustrated, the resistor 50 is energized from the alternating current supply circuit 12 by means of a full wave rectifier including a transformer 52 and an electric discharge device 53. The output of the rectifier is filtered by means of a series reactor 54 and parallel capacitor 55.

As is well understood by those skilled in the art, with the circuit described above the instant in the anode-cathode voltage wave at which electric valves 32 and 33 are rendered conductive may be determined by the magnitude of the unidirectional voltage impressed on the control members 40. The phase position of the periodic voltages of peaked wave form produced in the secondary windings 22 and 29 of the transformer 23 is determined by the instant at which valves 32 and 33 are rendered conductive. In this way, the slider 51 provides means for adjusting the instant of initiation of conduction of the main electric valves 10 and 11. The slider 51 may, therefore, be considered as a heat control. The phase shifting circuit 31 and the control therefor forms no part of my invention and is the prior invention of Maurice E. Bivens. This circuit is described and claimed in Bivens applications Serial No. 449,021, filed June 29, 1942, and Serial No. 460,240, filed September 30, 1942, both assigned to the assignee of the present invention.

In accordance with my invention, I provide means for indicating when the electric valves 10 and 11 are rendered conductive at a point corresponding to the normal current zero of the load circuit as determined by the power factor angle. Referring now to the drawing, this circuit includes a suitable indicating device, such as a glow discharge lamp 56, which is energized from the alternating current supply circuit by means of a secondary winding 57 of a transformer 58 having the primary winding 59 thereof connected to the supply circuit 12. The phase position of the voltage impressed on the indicating device 56 is adjusted by means of a resistor 60 connected in series with the secondary winding 57 and the electrodes of the discharge device 56. The phase position of the voltage impressed on the electrodes of device 56 is also determined by a capacitor 61 and fixed resistor 62 which are connected in series across the secondary winding 57 and adjustable resistor 60. In order to prevent energization of the device 56 during negative half cycles of voltage of the supply circuit 12, a unilaterally conducting device, such as one of the discharge paths of an electric discharge device 63, is connected in series with the electrodes of the indicating device 56. With the circuit just described, it is apparent that positive half cycles of voltage displaced in phase with respect to the supply circuit 12 are impressed on the discharge device 56, and that when this voltage reaches the breakdown voltage of device 56 a visual indication will be given. In order to prevent this indication except when the periodic voltages impressed on the control members of valves 10 and 11 are advanced to the phase position for which an indication is desired, I provide a controlled electric valve means 64 connected in shunt with the device 56 and the right-hand discharge path of the device 63. The valve 64 is preferably of the type employing an ionizable medium, such as a gas or a vapor, and includes a control member or grid 65 which is energized with a negative bias by means of a capacitor 66 and by the voltage of a capacitor 67 which is charged in accordance with the voltage appearing across the main electric valves 10 and 11 which are connected between the supply circuit 12 and the welding transformer 13. The circuit from the cathode to control member 65 of the valve 64 is completed through capacitor 66, capacitor 67 and a current limiting resistor 68. The negative bias of capacitor 66 is derived from the alternating current supply circuit 12 by means of a secondary winding 69 of the transformer 58 and the left-hand discharge path of the device 63 which are connected to supply unidirectional current to the capacitor 66 and a parallel connected resistor 70.

In many cases it has been found undesirable to connect a control circuit directly across the principal electrodes of the reversely connected electric valves which supply energy to the load circuit. For this reason, I derive the voltage for energizing the capacitor 67 by utilizing a component of voltage in phase with the supply circuit voltage and a component of voltage derived from the load circuit of transformer 13. Since the difference between these voltages is the voltage appearing across electric valves 10 and 11, this forms a convenient way of obtaining the desired response without connecting directly across the anode-cathode circuits of the valves. Referring now to the drawing, it will be seen that the charging circuit for the capacitor 67 includes a secondary winding 71 on transformer 58 which provides a component of voltage in phase with the supply circuit voltage, a transformer winding 72 of a transformer 73 having the primary winding 74 connected across the primary winding of the welding transformer 13, and a resistor 75 which determines the time constant of the charging circuit of the capacitor. The transformers are chosen so that the voltage components produced by windings 71 and 72 are substantially equal and of opposite instantaneous polarity so that the net voltage impressed on capacitor 67 is substantially zero when the electric valves 10 and 11 are rendered conductive at a point corresponding to the full heat position, that is, the electric valves 10 and 11 are rendered conductive at a point displaced from the voltage zero of the supply circuit 12 corresponding to the power factor angle of the load circuit. When the electric valves 10 and 11 are rendered conductive at instants retarded with respect to this point, the line voltage appears across the anode-cathode circuit of electric valves 10 and 11 for intervals having a duration which increases as the instants of initiation of conduction are retarded. This voltage is utilized to charge the capacitor 67 and to render electric valve 64 conductive. By proper selection of charging resistor 75 and the transformer including windings 71 and 72 it is possible to render the electric valve 64 conductive before the indicating device 56 breaks down for any desired phase position of the initiation of conduction of valves 10 and 11. In welding applications these constants may be selected so that electric valve 64 is rendered conductive to remove the voltage from device 56 before it breaks down until the conduction of electric valves 10 and 11 approaches the full heat condition. It will be apparent that if electric valve 64 is maintained nonconductive for the full cycle that the full voltage of winding 57 is impressed across the discharge device 56. If the power factor of the load is changed over a wide range it may be desirable to shift the phase of the voltage impressed on the discharge device 56 and on the anode-cathode circuit of valve 64. This may be accomplished by adjusting the tap on resistor 60.

From the foregoing description it will be apparent that once the indicating circuit has been adjusted to the welding system, the operator may adjust the heat setting of the welder and be provided with a visual indication that the adjustment is approaching the full heat position, and in this way avoid the danger of advancing the angle ahead of the voltage position and causing one of the reversely connected electric valves to fail to conduct.

In Fig. 2 there is illustrated an embodiment of my invention in a considerably simplified form which may be satisfactory in some applications although the indication is a little more difficult to utilize. In the arrangement shown in Fig. 2, the excitation circuit for electric valves 10 and 11 has been omitted and only the main electric valves 10 and 11 of the welding transformer 13 and the indicating circuit have been shown. It will be understood that the remainder of the circuit may take any desirable form and may be the same as described in connection with Fig. 1. In Fig. 2, the indicating circuit illustrated generally by the numeral 76 comprises a glow discharge device 77 and a parallel capacitor 78 which are energized in accordance with the voltage across the electric valves 10 and 11 through an adjustable resistor 79. It will be understood that this voltage may be derived by utilizing a component of voltage from the supply circuit and a component of voltage from the load circuit, as described in connection with Fig. 1.

In the operation of the embodiment illustrated in Fig. 2, the discharge device 77 breaks down and becomes illuminated each cycle that the electric valves 10 and 11 are rendered conductive at a point retarded with respect to the point for which the indicator is adjusted. If the indicator is adjusted to indicate when the electric valves approach conduction for full heat, the lamp 77 will glow due to the voltage across electric valves 10 and 11 until this point is reached. It will be apparent that the point back of full heat for which the indicator is adjusted may be controlled by adjusting the magnitude of resistance 79 which is connected in circuit with the indicating lamp 77 and capacitor 78.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. In combination, an alternating current supply circuit, an inductive load circuit, electric translating apparatus interconnecting said circuits including a pair of electric valve means reversely connected in parallel for transmitting alternating current to said load circuit, means for controlling the instant of initiation of conduction of said electric valve means, and means including means responsive to the voltage across said electric valves for indicating when said instant of initiation of conduction is advanced to a predetermined point with respect to the voltage of said supply circuit.

2. In combination, an alternating current supply circuit, an inductive load circuit, electric translating apparatus interconnecting said circuits including a pair of electric valve means reversely connected in parallel for transmitting alternating current to said load circuit, means for controlling the instant of initiation of conduction of said electric valve means, a glow discharge device, and means including a capacitor responsive to the voltage across said electric valves for controlling the voltage on said glow discharge device to indicate when said instant of initiation of conduction is advanced to a predetermined point with respect to the voltage of said supply circuit.

3. In combination, an alternating current supply circuit, an inductive load circuit, electric translating apparatus interconnecting said circuits including a pair of electric valve means reversely connected in parallel for transmitting alternating current to said load circuit, means for controlling the instant of initiation of conduction of said electric valve means, a capacitor, means for charging said capacitor in accordance with the voltage across the anode-cathode circuits of said electric valve means, means for producing an indication each cycle of voltage of said supply circuit, and means responsive to the voltage of said capacitor for preventing operation of said last mentioned means until said electric valve means conduct for a predetermined portion of each cycle.

4. In combination, an alternating current supply circuit, an inductive load circuit, electric translating apparatus interconnecting said circuits including a pair of electric valve means reversely connected in parallel for transmitting alternating current to said load circuit, means for controlling the instant of initiation of conduction of said electric valve means, a capacitor, means for charging said capacitor in accordance with the voltage across the anode-cathode circuits of said electric valve means, an indicating circuit requiring a predetermined voltage for operation, means for impressing a voltage on said indicating circuit which attains said predetermined value during each cycle of voltage of said supply circuit, and means responsive to the voltage of said capacitor for preventing operation of said indicating circuit when said valve means conduct less than a predetermined portion of a cycle of supply circuit voltage.

5. In combination, an alternating current supply circuit, an inductive load circuit, electric translating apparatus interconnecting said circuits including a pair of electric valve means reversely connected in parallel for transmitting alternating current to said load circuit, each of said electric valve means including a control electrode, means for impressing a periodic voltage on said control electrodes, means for adjusting the phase of said periodic voltage to control the instant of initiation of conduction of said electric valve means, and means responsive to the voltage appearing across said electric valve means for indicating when said electric valve means are rendered conductive, substantially at the normal current zero of said load circuit as determined by the power factor thereof.

BENJAMIN COOPER.